United States Patent [19]

Porter et al.

[11] 4,397,623

[45] Aug. 9, 1983

[54] APPARATUS FOR THE PRODUCTION OF MINERAL FIBERS BY MEANS OF ROTATING DISCS

[75] Inventors: William F. Porter, Tacoma, Wash.; Donald R. Janninck, Chicago, Ill.

[73] Assignee: United States Gypsum Company, Chicago, Ill.

[21] Appl. No.: 239,262

[22] Filed: Mar. 2, 1981

[51] Int. Cl.³ .............................................. B01J 2/02
[52] U.S. Cl. ......................................... 425/8; 264/8
[58] Field of Search ................................ 425/8; 264/8

[56] References Cited

U.S. PATENT DOCUMENTS 1,975,504 10/1934 Formhals ................................. 425/8
2,944,284 7/1960 Tillotson et al. ....................... 65/14
3,854,850 12/1974 Ueda et al. ............................. 425/8
3,904,344 9/1975 Maringer et al. ..................... 425/8
4,242,069 12/1980 Maringer ............................... 425/8

*Primary Examiner*—James R. Hall
*Attorney, Agent, or Firm*—Samuel Kurlandsky; Robert M. Didrick; Robert H. Robinson

[57] ABSTRACT

An apparatus for producing mineral fibers comprising a container having means for heating the mineral material to form a molten pool therein, a plurality of discs having a portion thereof immersed in the molten pool, and means for rotating the discs in the same angular direction at high speed. In a preferred embodiment means are provided for moving a gas such as air or steam across the edges of the rotating discs to assist in the attenuation of the fibers.

6 Claims, 4 Drawing Figures

APPARATUS FOR THE PRODUCTION OF MINERAL FIBERS BY MEANS OF ROTATING DISCS

BACKGROUND OF THE INVENTION

(1) Field of the Invention

The present invention relates to an apparatus for producing mineral fibers, and more particularly refers to such an apparatus in which a plurality of rotating discs are utilized in the production of the fibers.

(2) Description of the Prior Art

It has been conventional in the prior art to produce glass and mineral wool fibers by conveying a stream of molten material such as glass or slag onto a rotating surface. The molten material is thereby centrifuged into the path of a high velocity stream formed of superheated steam. The centrifuged material originally in the form of finely divided molten streams is blasted by the steam and formed into solidified material of fibrous form. Among the patents which disclose this method are U.S. Pat. Nos. 2,869,175, 2,944,284, 3,013,299 and 3,022,538. However, the processes disclosed using steam are not completely satisfactory, since, the relatively high velocity and impact force of steam cause an undesirable attenuation and severance or breakage of the mineral fibers, thereby reducing the efficiency of the apparatus and the quality of the finished product. Moreover, the use of steam requires rotor speeds of the centrifugal apparatus to be kept within critical limits in order to obtain filaments of a desired diameter. For example, where speed of the rotor is too high, the secondary attenuation produced thereby results in loose fibers which are too thin and frangible for normal use. Further, the fibers produced are of extremely short length and do not assume the structure of elongated threads or fibers. In order to overcome the deficiencies of steam operated fiberizing equipment, a method and apparatus are disclosed in U.S. Pat. No. 2,882,552 for using compressed air of low pressure to avoid the undesirable effects resulting from the use of high pressure steam. In the use of compressed air an advantage is realized in that no secondary attenuating defects are realized, and the tendency to break or sever the filaments into short lengths is eliminated. However, the method and apparatus disclosed in that patent are not as efficient as desired and the quality of the mineral wool produced still leaves something to be desired with respect to the quality and the surface uniformity and smoothness of the finished fibers. Moreover, the apparatus disclosed in the patent is awkward to load and difficult to operate. The apparatus requires the continuous attention of an operator, is erratic, produces low yield and a high ratio of shot to fibers.

In U.S. Pat. No. 4,106,921 an apparatus is disclosed and claimed for the low pressure air fiberization of mineral fibers. This apparatus provides for improved attentuation of mineral fibers. The fibers produced with the air blowing apparatus are finer, smoother and stronger than those produced with steam. However, further improvement with regard to the quality of mineral fibers produced and the cost of production, particularly in view of the increased costs of fuel, are highly desirable.

SUMMARY OF THE INVENTION

It is accordingly an object of the present invention to provide an apparatus for the production of mineral fibers which is more efficient than that of existing methods and apparatus.

It is further an object of the invention to provide an apparatus for producing mineral fibers wherein the fibers are of more uniform and longer length and have better surface properties.

It is still further an object to provide an apparatus for the fiberization of mineral fibers which is relatively inexpensive and simple to fabricate, and which will operate over extended periods of time without the need for repair or rebuilding.

Other objects and advantages of the invention will become apparent upon reference to the drawings and details of the description.

According to the present invention, an apparatus is provided for producing mineral fiber comprising a tank with heating means for maintaining the mineral material in a molten state. A plurality of discs are rotatably mounted about horizontal axes with a portion of the discs immersed in the liquid mineral material. When the discs are rotated in the same angular direction at a high rotational speed, streams or filaments of the liquid are thrown on a vector tangent to the periphery of each disc. The fluid "throw off" is directed from each disc to the succeeding rotating disc. This results in the succeeding rotating disc again throwing the liquid material in a similar vector, forming some fibers and returning a portion of the liquid to the molten bath to be reprocessed. In a preferred embodiment means is provided near the upper edges of the discs for directing gaseous blasts along the upper surfaces of the discs to provide further attenuation of the liquid streams and removal of the fibers thus formed.

DESCRIPTION OF THE PREFERRED EMBODIMENTS

Figure 1:
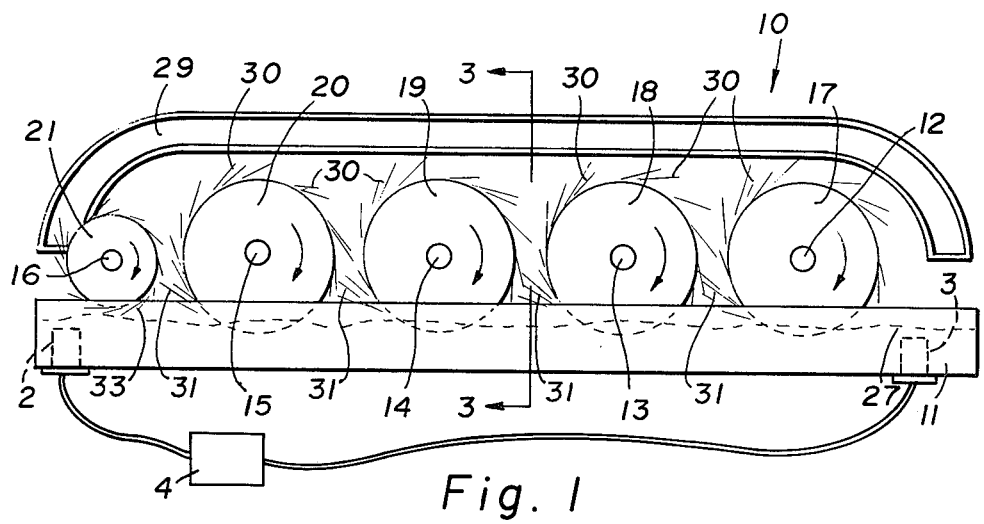
FIG. 1 is an elevational view partly in cross-section of an apparatus according to the invention.
Figure 2:
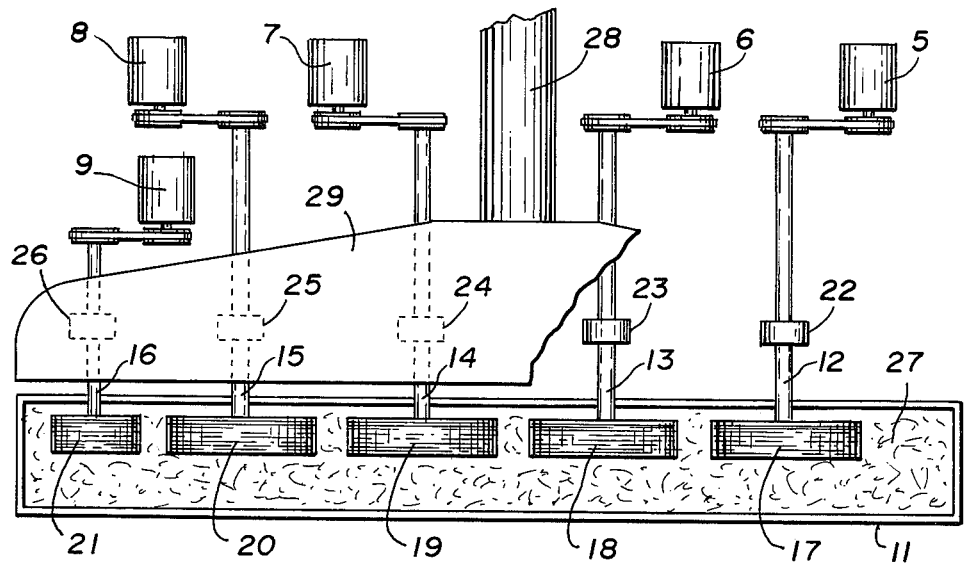
FIG. 2 is a top view, partly broken away, of the apparatus shown in FIG. 1.
Figure 3:
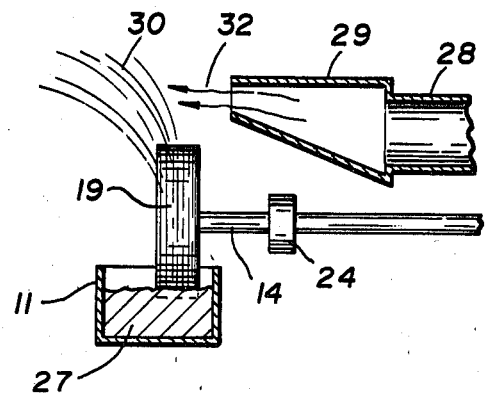
FIG. 3 is a fragmentary cross-sectional view taken at the line 3—3 of FIG. 1, looking in the direction of the arrows.

Referring to FIGS. 1-3 an apparatus 10 according to the invention is shown comprising a tank or container 11 for containing molten mineral composition 27. The container may be heated by a submerged arc heater having carbon electrodes 2 and 3 and powered by an electrical source 4. Alternatively, the container and contents may be heated by induction heating, resistance heating, gas oven firing, etc. (not shown). A plurality of shafts 12, 13, 14, 15 and 16 are rotatably mounted on the apparatus and have a plurality of discs 17, 18, 19, 20 and 21 mounted on the ends of the shafts, respectively. The shafts are mounted in bearings 22, 23, 24, 25 & 26, respectively, and driven by motors 5, 6, 7, 8 & 9. Alternatively, the shafts may be coupled by gears or belts and driven by a common motor.

An air duct 28 is connected to a blower, not shown and introduces air into gas distribution duct 29.

In operation, a mineral composition 27, such as slag, which is a by-product of the metal industries, or basalt, a naturally occuring mineral, is heated to a temperature at which it exists in molten form of a low viscosity. The discs 17-20 are positioned so that their lower peripheries are immersed in the molten liquid. The disc 21 is positioned with its lower periphery spaced above the surface of the liquid material. The discs are preferably water cooled by introducing water into ducts contained in their interior. The discs 17-21 in operation are placed in rapid rotation in the same angular direction. The discs cause a mixture of fine spray, streams or droplets of the molten material to be thrown off from the peripheral surfaces of the discs. Some fine streams 30 of the molten material rise above the discs and are entrailed laterally in the surrounding air, causing fibers to be formed. The fibers may be removed from the apparatus by any suitable means. The streams 30 may be further attenuated by air or other gases such as steam forced through the air distribution duct 29. The massive streams and droplets of molten material 31 generated at the peripheral surface of the first disc and not attenuated into fibers strike the successive rotating disc which returns the material back into the molten pool contained in the tank. The same operation takes place with the second, third, and fourth successive discs. During each operation a portion of the molten material is removed and formed into fibers and the remainder returned to the pool. The last disc 21 has a smaller diameter and does not have its lower periphery immersed in the pool of molten material. Its function is to return to the tank that portion of the melt 33 received from the preceeding disc which has not entered into the fiberizing process.

In FIG. 3 one disc 19 and a portion of the air or gas distribution duct 29 are shown in detail. The molten mineral composition 27 is shown in the tank 11. The direction of the air flow 32 from the air distributor duct 29 is shown, and the mineral fiber 30 being produced is shown being blown laterally from the apparatus, where it is collected by means of a cyclone collector or other types of collectors, not shown.

Figure 4:
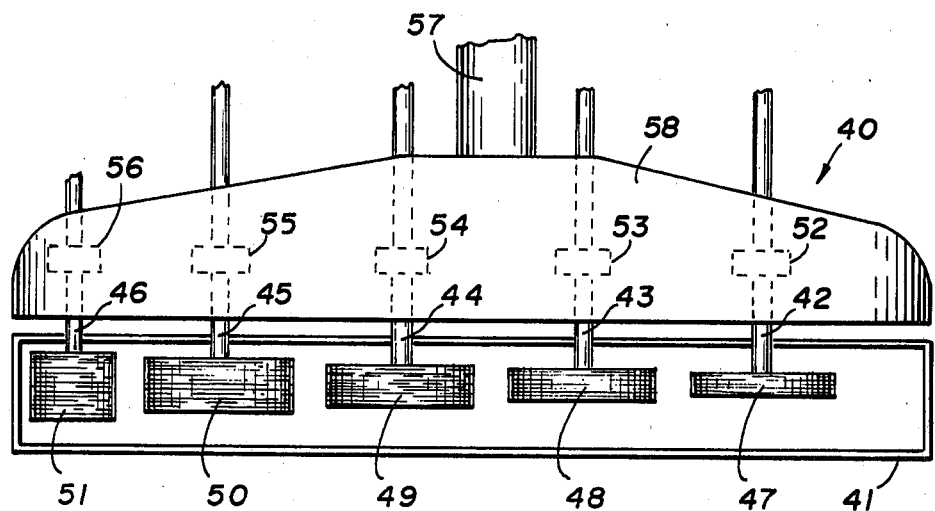
FIG. 4 is a top view, of a modified embodiment of the invention.

Referring to FIG. 4, an apparatus 40 for forming mineral fibers is shown in another embodiment and comprises a tank 41, shafts 42, 43, 44, 45 & 46 having discs 47, 48, 49, 50 and 51 mounted thereon. The shafts 42, 43, 44, 45 & 46 are journaled in bearings 52, 53, 54, 55 & 56, the shafts being driven by motors (not shown) in a manner similar to that shown and described with regard to FIGS. 1-3. The discs 47-50 have their lower peripheries disposed within the molten mineral composition. The disc 51 has a smaller diameter and does not extend into the liquid pool. Its purpose is to capture the larger drops and conglomerates of the liquid which have not been transformed into fiber and to return the unfiberized liquid material to the liquid pool contained in the tank. As can be seen in FIG. 4, the axial dimensions of the successive discs increase, with the disc 51 having the greatest axial thickness. This arrangement is provided to facilitate the capture by successive discs of the drops and conglomerates of the molten mineral composition which are ejected by each preceding disc.

The discs 17-21 and 47-51 are preferably formed of steel. They are advantageously cooled by the circulation of water therein not shown. Since the discs are cooled to a temperature lower than that of the melting point of the slag, a layer of solidified slag is formed at the periphery of the discs and is maintained throughout the process. The direction of rotation of each of the discs in the preferred embodiment is maintained in the same direction. Consequently, liquid streams and globules of the molten mineral slag are thrown at and captured by each succeeding disc and a portion returned to the molten slag pool for further operation and attenuation. The mineral wool formed from the molten material and ejected upwardly by each disc is blown by the air from the air ducts 28 and 57 through the air distributor ducts 29 and 58 to a collector, as for example a Cyclone collector. The formed mineral fibers are transported by the collector and deposited in a suitable container. Because of the efficient operation of the discs to attenuate the melt into fibers, very little flow is required by the air stream from the distribution duct for further forming and removing the formed fibers from the attenuating apparatus. Where a Cyclone collector is utilized, the vacuum imposed by the collector causes an almost sufficient movement of air in itself to form and remove the attenuated fiber from the attenuating apparatus and at most only a low velocity air stream need be applied by the distribution duct.

It is to be understood that the invention is not to be limited to the exact details of construction or operation or materials shown and described, as obvious modifications and equivalents will be apparent to one skilled in the art.

Invention is claimed as follows:

1. An apparatus for producing mineral fibers from a molten mineral composition, which comprises,
   a. a container for holding said mineral composition in molten form, and means for heating said composition and maintaining said composition in molten form,
   b. a plurality of discs affixed to spaced-apart substantially parallel horizontal shafts, said discs being in substantially coplanar arrangement, and being positioned so that the lower edge of all but the last one of said discs are immersed in said molten composition during operation, and
   c. means for rotating all said shafts and discs affixed thereto in the same angular direction, said discs being arranged and dimensioned to propel a portion of molten slag from their peripheries in the form of elongated droplets or streams, a portion of said elongated droplets or streams being propelled on a vector tangent from one disc to another, said elongate droplets or streams passing through a cooling zone of air where they become solidified as fibers and removed from said apparatus, the portion of said molten slag removed from said container by said discs but not formed into fibers returning to said container.

2. An apparatus according to claim 1, having duct means for directing air flow, and distributor means connected to said duct means for directing said air flow across the upper peripheral edges of said discs to attenuate further fibers from said molten composition, the air from said distributor being arranged to blow attenuated fibers away from said apparatus.

3. An apparatus according to claim 2, including a first, second, third, etc. and last disc, wherein the last one of said discs has a smaller diameter than that of the remainder of said discs so that its lower periphery is spaced above the upper surface of said molten composition.

4. An apparatus according to claim 2, wherein successive discs have a greater axial thickness than each preceding disc.

5. An apparatus according to claim 2, wherein said mineral composition is by-product slag.

6. An apparatus according to claim 2, wherein said mineral composition is basalt.

* * * * *